(12) United States Patent
Seba et al.

(10) Patent No.: US 12,326,121 B2
(45) Date of Patent: Jun. 10, 2025

(54) METHOD FOR OPERATING AN INTERNAL COMBUSTION ENGINE USING A GASEOUS FUEL, AND INTERNAL COMBUSTION ENGINE

(71) Applicant: Liebherr Machines Bulle SA, Bulle (CH)

(72) Inventors: Bouzid Seba, Riaz (CH); Michael-Alexandre Baert, Murten (CH); Sandro Silvestrini, Canobbio (CH); Roberto Andreutti, Barbengo (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 0 days.

(21) Appl. No.: 18/073,481

(22) Filed: Dec. 1, 2022

(65) Prior Publication Data

US 2023/0167778 A1    Jun. 1, 2023

(30) Foreign Application Priority Data

Dec. 1, 2021  (CH) ................................ 070630/2021

(51) Int. Cl.
  *F02D 41/00*   (2006.01)
  *F02D 41/38*   (2006.01)

(52) U.S. Cl.
  CPC ..... *F02D 41/0027* (2013.01); *F02D 41/0087* (2013.01); *F02D 41/3845* (2013.01); *F02D 2250/31* (2013.01)

(58) Field of Classification Search
  CPC ............. F02D 41/0027; F02D 41/0087; F02D 41/3845; F02D 2250/31

USPC ......................................................... 123/445
See application file for complete search history.

(56) References Cited

U.S. PATENT DOCUMENTS

| | | | | |
|---|---|---|---|---|
| 5,067,467 A * | 11/1991 | Hill | ...................... | F02M 69/045 123/497 |
| 7,463,967 B2 * | 12/2008 | Ancimer | ................. | F02D 19/10 123/480 |
| 9,027,534 B2 * | 5/2015 | Kim | ..................... | F02D 19/0623 123/456 |
| 9,732,713 B2 * | 8/2017 | Bandyopadhyay | ......................... | F02D 41/3047 |
| 9,752,520 B2 * | 9/2017 | Pursifull | ............. | F02D 19/0692 |
| 9,850,867 B2 * | 12/2017 | Sugiyama | ........... | F02D 41/0027 |
| 10,113,510 B2 * | 10/2018 | Saleri | ................. | F02M 21/0239 |

(Continued)

FOREIGN PATENT DOCUMENTS

DE   112006001271 T5   3/2008
DE   102014209832 A1   12/2014

*Primary Examiner* — Logan M Kraft
*Assistant Examiner* — John D Bailey
(74) *Attorney, Agent, or Firm* — McCoy Russell LLP (57) ABSTRACT

The disclosure relates to a method for operating an internal combustion engine comprising at least two cylinders and a system for fuel injection, in which the fuel is withdrawn from a primary tank and supplied to at least one rail in a form significantly compressed compared with atmospheric pressure, and a plurality of cylinders draw the gaseous fuel from a rail used collectively, wherein, during operation of the internal combustion engine, the pressure target value of the gaseous fuel stored in the rail is controlled to or otherwise held at a constant value or a variable target value, which changes only in a small range B, irrespective of the engine operating point.

13 Claims, 4 Drawing Sheets

(56) References Cited

U.S. PATENT DOCUMENTS

| | | | |
|---|---|---|---|
| 2005/0161023 A1* | 7/2005 | Albertson | F02D 41/0087 123/568.21 |
| 2005/0279321 A1* | 12/2005 | Crawford | F02B 23/0696 123/260 |
| 2006/0048981 A1* | 3/2006 | Bychkovski | F02B 69/06 60/605.1 |
| 2006/0254560 A1* | 11/2006 | Mann | F02B 19/10 123/305 |
| 2007/0032340 A1* | 2/2007 | Hrovat | B60W 30/19 477/107 |
| 2008/0173280 A1* | 7/2008 | Hou | F02D 41/3836 123/514 |
| 2009/0055076 A1* | 2/2009 | Onishi | F02D 41/402 701/103 |
| 2009/0084348 A1* | 4/2009 | Batenburg | F02D 35/024 123/294 |
| 2010/0050993 A1* | 3/2010 | Zhao | F02D 41/0087 123/481 |
| 2011/0088655 A1* | 4/2011 | Ancimer | F02D 41/0027 123/299 |
| 2013/0333663 A1* | 12/2013 | Chen | F02D 13/06 123/334 |
| 2014/0076283 A1* | 3/2014 | Pursifull | F02M 21/0239 123/457 |
| 2014/0081565 A1* | 3/2014 | Pursifull | F02D 19/022 123/457 |
| 2014/0142832 A1* | 5/2014 | Pursifull | F02D 41/22 701/101 |
| 2014/0305406 A1* | 10/2014 | Pursifull | F02M 57/026 123/434 |
| 2014/0358407 A1* | 12/2014 | Pursifull | F02D 41/062 701/113 |
| 2014/0358408 A1* | 12/2014 | Pursifull | F02D 19/0647 123/403 |
| 2015/0051809 A1* | 2/2015 | Glugla | F02D 41/3836 123/406.12 |
| 2016/0115878 A1* | 4/2016 | VanDerWege | F02D 41/0087 123/333 |
| 2017/0030299 A1* | 2/2017 | Aríztegui Cortijo | F02M 21/0212 |
| 2017/0074212 A1* | 3/2017 | Lorts | F02M 21/02 |
| 2017/0082041 A1* | 3/2017 | Hirose | F02D 19/0642 |
| 2017/0356358 A1* | 12/2017 | Richards | F02D 41/26 |
| 2017/0356369 A1* | 12/2017 | Doering | F02D 41/26 |
| 2017/0356370 A1* | 12/2017 | Doering | F02D 17/02 |
| 2017/0356382 A1* | 12/2017 | McQuillen | F02D 41/401 |
| 2018/0298848 A1* | 10/2018 | Ulrey | F02M 21/0278 |
| 2019/0101067 A1* | 4/2019 | Wallengren | F02D 41/18 |
| 2019/0242307 A1* | 8/2019 | Engfehr | F02D 19/0628 |
| 2020/0256263 A1* | 8/2020 | Rollinger | F02D 41/1454 |
| 2020/0370482 A1* | 11/2020 | Tan | F02D 41/3836 |
| 2020/0378328 A1* | 12/2020 | Janzen | F02D 41/009 |

* cited by examiner

METHOD FOR OPERATING AN INTERNAL COMBUSTION ENGINE USING A GASEOUS FUEL, AND INTERNAL COMBUSTION ENGINE

CROSS-REFERENCE TO RELATED APPLICATION

The present application claims priority to Swiss Patent Application No. 070630/2021 filed on Dec. 1, 2021. The entire contents of the above-listed application are hereby incorporated by reference for all purposes.

TECHNICAL FIELD

The disclosure relates to a method for operating an internal combustion engine comprising at least two cylinders and a system for fuel injection, in which the fuel is withdrawn from a primary tank and supplied to a fuel high-pressure reservoir referred to as a rail, in a form significantly compressed compared with atmospheric pressure, and a plurality of cylinders draw the gaseous fuel from the rail used collectively.

BACKGROUND

On account of generally known advantages, the supply of fuel into the port or into the combustion chambers of current internal combustion engines often takes place under a significantly or a very significantly increased pressure. If the engine design provides the same, the internal combustion engine generally comprises a rail which fulfils the function of a storage reservoir. The fuel reserves stored inside the rail should have a defined pressure level. In order to comply with this requirement, the fuel withdrawn from the primary tank can be compressed along its supply path in the rail, by means of what is known as a rail pressure pump. Up to a certain cylinder-related displacement volume, which is in an order of magnitude of approximately 3 liters, usually a common rail is used for all or a plurality of combustion chambers of the internal combustion engine. Typically, a rail pressure pump is driven by means of an auxiliary drive of the internal combustion engine, as a result of which, in the case of low engine speeds, only a comparatively small "rail pressure" (the pressure level of the fuel stored in the rail 2) can be generated. For current internal combustion engines, which are designed for conventional fuels, for example diesel fuel, and are equipped with what is known as a common rail system, rail pressures up to over 2000 bar are achieved.

SUMMARY

In order to be able to react quickly to changes in the target output power of the internal combustion engine, the opening duration of the currently active injector and/or the injector that is to be activated immediately subsequently, can be increased or reduced accordingly. Thus, in the event of a currently occurring increase in the target delivery power, which clearly requires an increased fuel supply quantity in order to be covered, the opening duration of the relevant injector, via which the current supply of fuel into the combustion chamber is already taking place or will take place directly, is extended. In order to be able to constantly cover an increased time-related fuel supply quantity, it is known that the rail pressure must also be increased. The time-related fuel supply quantity increases in the case of an increasing engine speed and in the case of an increasing engine output torque. Thus, in the case of an increase in the target output power a target value increase of the rail pressure takes place, in order that the intended fuel supply amount can also actually be provided, in order to cover the power, in the respective time windows in which a fuel injection is possible or within which the fuel injection may optionally take place.

On the one hand, an increase in the time-related flow of fuel through an open injector provides an increase in the flexibility of the time portions and/or the crankshaft angle ranges, within a respective interval of 0° to 360°, at which a respective fuel injection can be performed by corresponding opening and closing of the relevant injector. On the other hand, however, longer injector opening time periods offer greater reproducibility of the amounts of fuel, in the case of injection processes taking place under the same operating conditions, because the cumulative fuel inflow during closing and during opening makes up a smaller portion of the amount of fuel supplied into the combustion chamber during a complete injection process. Overall, a fuel high-pressure injection offers a high optimization potential for the operation of an internal combustion engine.

For the fuel example of diesel, the rail pressure pump always requires an amount of fuel to the rail which is at least slightly greater than the current fuel consumption of the internal combustion engine. If the rail pressure reaches or has already exceeded its target value, the excess amount of fuel added to the rail or already contained therein is discharged out of the rail, and in the process returned to the primary tank.

Since liquids can be compressed much more easily than gases, to a pressure level of from a few 10 bar to several hundred bar, and, as is generally known, liquids have a significantly higher density than gases, and furthermore the widely used liquid fuels (diesel and diesel-like fuels, petrol, LPG, etc.) can already be stored in the primary tank under usual environmental conditions, i.e. an atmospheric or slightly higher pressure and under usual ambient temperatures, the above-mentioned measures are still comparatively easy to implement, in technical terms, for these fuels, in view of the possibility of a quick increase in the fuel supply amount.

Clearly, a quick increase in the mechanical delivery power of an internal combustion engine also presupposes a corresponding highly dynamic increase in the amount of air to be supplied. If the requirement of a transient power increase takes place during an initial position in which the current air supply into the combustion chambers is limited by throttling in the air path and/or by mixing in exhaust gas, at least some increase in the air supply is possible relatively quickly. Furthermore, certain auxiliary means are generally known, by which the air supply can be increased comparatively quickly and significantly, e.g. by means of an electrically drive compressor integrated in the air path.

In the case of an internal combustion engine operated using a conventional fuel, the dynamics thereof are due substantially to the limited rate of increase of the air supply. In contrast, the limited rate of increase of the supply of fuel can also be decisive for the dynamics limitation of a gas engine, e.g. in the embodiment of a hydrogen engine. In other words: If a gas engine requires high power dynamics, it is not sufficient to merely focus on the air pathway, unless the fuel is stored in the primary tank as compressed gas, and the withdrawal thereof is provided merely until there is a drop to such a pressure level which is still sufficiently high to cover the provided maximum value of the rail pressure. Otherwise, beyond a particular dynamics to be achieved, simply providing for the air path to be equipped with such auxiliary means that allow a high rate of increase of the air supply is no longer sufficient, but rather suitable measures must also be taken in the fuel path, which measures allow for a high rate of increase of the fuel supply. The latter is all the more urgent the lower the density of the gaseous fuel.

For a fuel which, after being withdrawn from the primary tank and prior to being introduced into the rail, is merely compressed—for example diesel fuel, in the case of a significant reduction in the target output power of the internal combustion engine operated thereby, the rail pressure can be easily reduced in that a certain portion of fuel already contained in the rail is returned to the primary tank. This requires merely one further fuel line which comprises a valve PCV which is arranged such that, when the valve PCV is opened, a fuel return from the rail into the primary tank takes place. If, however, a gaseous fuel is stored in the primary tank not in gas form but rather, for example, in liquid form or in a chemical bond, an excess fuel amount contained in the rail can no longer be returned to the primary tank at all, or a return would be very complex and/or highly inexpedient.

When a high and simultaneously quick increase in the target output power of a gas engine occurs, the extension of the respective opening time periods of the injectors is at least temporarily possible only to a limited extend, since an "unexpectedly" long opening leads to a significant drop in the rail pressure. Before the device for supply of fuel into the rail has adjusted to the increased fuel amount requirement, the respective extension of the opening duration of an injector constitutes a compromise solution. If the opening time of an injector were extended excessively, in order to already approximately or completely fulfil the fuel amount requirement of the current injection process, too great a rail pressure decrease would occur, as a result of which the amount of fuel supply would decline for the following or for following injection processes, although said amount should clearly increase in order to fulfil the required power increase.

If the primary tank of the gaseous fuel is designed as a pressure reservoir, and the gas pressure therein exceeds the rail pressure target value by a corresponding minimum amount, a quick increase in the rail pressure is clearly easily possible. If, however, no further auxiliary means for increasing the rail pressure are provided, in the case of a correspondingly high target value a comparatively high portion of the gaseous fuel located in the primary tank cannot be used.

If the gaseous fuel has a very low boiling point and is stored as liquid gas, the conditioning of the fuel requires it to be strongly heated accordingly. In such a case, an increase in the fuel requirement, i.e. an increase in compressed gaseous fuel, and specifically with respect to the required pressure level and in terms of amount, includes the need for a temporally and locally matched increase in the heat input into the fuel supply path. Examples of such fuels are liquid hydrogen and liquified natural gas.

If the gaseous fuel in the primary tank is stored not in its molecular form but rather in a chemically bonded manner, an increased provision of fuel, with respect to the pressure level thereof and the amount thereof, includes all the process steps along a multi-stage conditioning path. If the fuel is for example hydrogen, which is stored in the primary tank in a liquid organic hydrogen carrier (LOHC), said carrier fluid must first be conditioned for a reformation process and pass through said reformation process. The hydrogen then available in its molecular form is then already present in gas form and must then be compressed (again) if the pressure level required in the rail is higher than the pressure level, corresponding thereto, under which the liquid organic hydrogen carrier can be supplied to the reformation process.

Since gases are known to be compressible, the spray pattern of an aperture located in the gas flow path is highly dependent on the pressure of the gas flowing through the aperture. Accordingly, the embodiment of an injector nozzle of a gas injector which can be used for a large pressure range constitutes a compromise solution or merely a partially good design. This in turn results in the spray pattern or the design of the spray channels of a gas injector, which must be usable in practice within a wide pressure range, at least tending to be used virtually always outside of its optimal range, or at least in a high portion of the fuel used necessarily being injected having a less favorable spray pattern.

Figure 1:
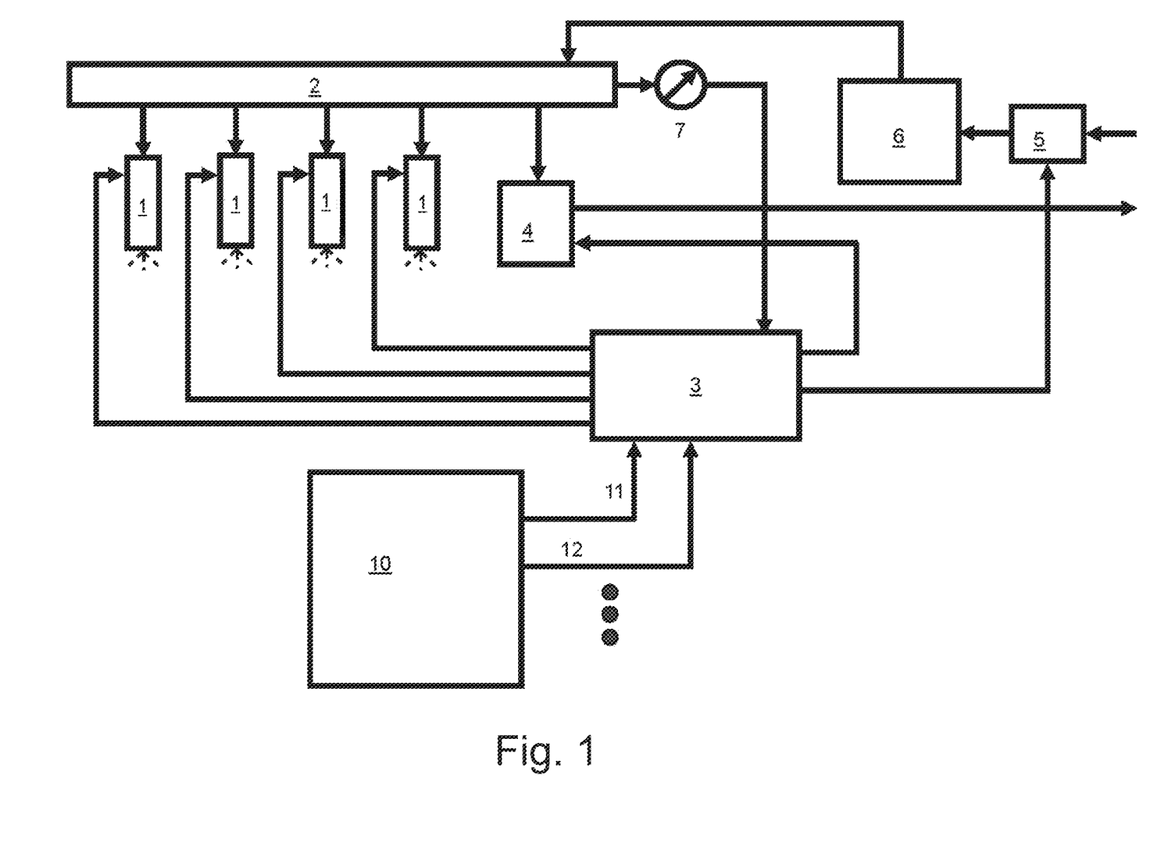
FIG. 1: is a schematic block circuit diagram of a conventional internal combustion engine having common rail injection.

FIG. 1 shows an exemplary embodiment of a common rail system according to the prior art. The supply of fuel into the combustion chambers (not shown) takes place over or during coordinated opening time periods of the injectors 1 which draw the fuel from a rail 2 used collectively. This coordination is implemented by a control unit, which, as in most embodiment applications, is a component of the engine controller 3, depending on particular operating variables (for example the current speed, the current torque, etc.), particular target variables (for example the target speed, etc.), and particular characteristic diagrams which are stored in the engine controller 3 as parameters. The fuel injection amount of an injection process is influenced in a defined manner by the rail pressure and the opening duration of the injector 1. Although, in preparation for a combustion process, in purely physical terms a fuel injection during the entire compression phase of a cylinder would be possible, time periods remain within the compression phase in which the relevant injector 1 is closed, even if the maximum fuel requirement is present. The following considerations are restricted to the main injection.

In order that the actual fuel allocation corresponds, as well as possible, to its target value, a comparatively low rail pressure target value is provided. In order that a sufficiently high supply of fuel can be achieved in the upper load range, a significantly higher rail pressure target value is provided. Extremely high rail pressures of far above 1000 bar offer inter alia the advantage that, even in the case of a maximum power of the internal combustion engine being provided, the fuel injection can take place within a small time window during the compression phase, which in turn offers a high degree of flexibility, and thus an optimization potential for the selection of a crankshaft phase angle range in which the fuel injection is to take place, and/or furthermore offers the option that the fuel supply for the relevant combustion chamber can be divided into a plurality of injection processes, within one single compression phase of a cylinder.

A rail pressure control can particularly advantageously be achieved, according to FIG. 1, by actuation of two valves 4, 5 which are arranged in accordance with their function. Depending on particular operating variables and parameters, the engine controller 3 determines a target value rail pressure and compares this with the rail pressure actual value, which leads to a corresponding actuation of the pressure control valve 4 (PCV). At the same time, the engine controller determines the actuation of the volume flow control valve 5 (VCV), which is arranged before the fuel compression, on the fuel path. If the rail pressure actual value is significantly below its target value and/or there is a higher fuel requirement, the volume flow control valve 5 tends to be in a wide open position. If the rail pressure actual value significantly exceeds the target value, the volume flow control valve VCV 5 is in the shut-off position or allows only such a fuel volume flow to pass through which is required for the self-lubrication of the subsystem serving to compress the fuel, in particular the rail pressure pump 6.

If a rapid drop in the delivery power required by the internal combustion engine occurs, for example because an acceleration process has ended or the load torque significantly reduces on account of a completed work process, then a significant reduction in the rail pressure target value takes place. In such a case, a comparatively large fuel quantity has to be discharged from the rail 2. As already mentioned, in the case of particular liquid fuels, such as diesel fuel, a diesel-like fuel, or petrol, etc., in order to reduce an excess pressure in the rail 2 (the current rail pressure actual value exceeds the current rail pressure target value) the excess fuel can be returned from the rail 2 into the primary tank (not shown), for which purpose solely and merely a corresponding fuel connection, which is opened via the pressure control valve PCV 4 for the purpose of rail pressure reduction and is otherwise closed, is required, because, on account of the large pressure drop of the fuel located in the rail 2 compared with the internal pressure in the primary tank, i.e. the tank to which the fuel is supplied during refueling of the system, for example a vehicle, said fuel return takes place automatically.

In the case of other fuels, such as a gaseous fuel stored (i) as liquid gas, (ii) under high pressure, or (iii) in a chemical bond, an excess fuel amount contained in the rail 2 can either no longer be returned to the primary tank at all, or a return would be very complex and/or highly impractical.

(i)

Up to a certain level of emptying of the primary tank designed as a pressure tank, for said return of a particular fuel amount from the rail 2, that fuel amount would have to be compressed. However, since this does not appear possible at all in a correspondingly short time, the presence and use of a buffer tank would probably be required.

(ii)

Prior to the return of the fuel from the rail 2 into a primary tank designed as a liquid gas tank, liquefaction would be required, which is not practicable on-board. Adding a buffer tank designed as a pressure vessel would be viable, which tank can receive the fuel to be discharged from the rail 2.

(iii)

Here, too, the availability of a buffer tank designed as a pressure vessel would be essential.

In order to be able to later actually use, in the internal combustion engine, said fuel amount which is to be discharged from the rail 2 and is intended to be recuperated in the buffer tank, further not insignificant effort would be required. (Alternatively, it would be possible to omit a recovery of said fuel amount for later use in the internal combustion engine, and rather to use at least a certain portion of said fuel amount in other ways, e.g. via an APU (auxiliary power unit), which can for example be designed as a fuel cell by means of which a battery is charged). If the use requires a certain dynamic of the power to be generated by the internal combustion engine, and this is reflected in the target value curve of the rail pressure and thus in the fuel portions to be discharged from the rail 2, the consequence results that the amount of recuperable fuel cannot be used expediently, in terms of energy, in many applications.

It is therefore desirable to modify the existing internal combustion engine in order to avoid the above-mentioned problems for gas operation, for example using natural gas or in particular hydrogen, and nonetheless allow for a significant increase in the fuel supply, in order to achieve a dynamics increase, within a short time period.

The method according to the disclosure is intended for operation of an internal combustion engine which comprises one rail 2 for collectively supplying a plurality of combustion chambers of the internal combustion engine with a compressed gaseous fuel. The fuel withdrawn from the primary tank is compressed by means of a suitable device, in particular a rail pressure pump, and temporarily stored in the rail under a pressure that is increased accordingly. The rail is connected to the individual injectors for fuel injection by means of high-pressure lines. According to the disclosure, it is proposed, in contrast with longstanding practice, that the target pressure level of the fuel stored in the rail—what is known as the rail pressure—should not be dynamically varied, or should be dynamically varied significantly less, depending on the engine load. Instead, the rail pressure actual value, within the entire speed/torque range in which the internal combustion engine is operated, is intended to be regulated to or otherwise held at an optionally constant or at least only slightly varying rail pressure target value. Holding in another manner can be achieved for example by a controller. Optionally, the level of the rail pressure is virtually constant and is independent of the current engine load, i.e. the pressure value of the fuel stored in the rail, referred to as the rail pressure, is virtually identical both in full-load operation and in partial load operation, and even in idle operation of the engine.

In this case, the rail pressure target value is optionally defined in view of the operating case of the maximum current fuel requirement, wherein this fuel requirement results, on account of the design, for example by way of component fitting of the internal combustion engine, including the exhaust gas post-treatment thereof, which is decisive for this limitation, in legally justified or other limitation. Accordingly, in the event of the rail pressure target value being covered by the corresponding actual value, a sufficient fuel supply can be achieved, in the operating case of the maximum fuel requirement of the internal combustion engine. Thus, even in the case of a highly dynamic increase in the required delivery power of the internal combustion engine, the fuel pressure provided for fulfilling this requirement as far as possible is available virtually without delay, such that even when a gaseous fuel is used a highly dynamic behavior of the system to be driven by the internal combustion engine—for example a vehicle or a mobile work machine—can be assisted significantly more effectively than could be achieved using a common rail system according to the prior art.

The method according to the disclosure serves in particular for operating a gas engine. A gaseous fuel is used as the fuel, wherein the advantage of the method according to the disclosure is expedient if the fuel in the rail has to be present in its gaseous aggregate state. In view of the present disclosure, it is irrelevant whether the fuel in the primary tank is present for example in liquid form. In particular hydrogen is used as the fuel. The application of the method to an internal combustion engine which uses different gaseous fuels, e.g. natural gas, is also conceivable.

For the operation of an internal combustion engine according to the disclosure, it is desirable for the opening times of the injectors, more precisely the injectors actively participating in the current operation of the internal combustion engine, to not be shortened at all, or to be shortened as little as possible, irrespective of the capacity utilization of the internal combustion engine. The background for this is that in the case of longer valve opening times better reproducibility of the injected fuel amount is possible. Optionally, the opening time of the injector valves remains constant irrespective of the operating point, or is not shortened to such an extent, at any engine operating point, that a substantial portion of the fuel flow via an injector takes place during the switching transition thereof (opening or closing).

In partial load operation, in the case of a rail pressure which remains constant throughout or varies only slightly with respect to the main injections, stabilization of the valve opening times or permanent exceeding of a minimum opening duration in each case, which remains at a comparatively high level, can be achieved in that one or more cylinders are deactivated in a load-dependent manner. The deactivation of a cylinder can be restricted to one single engine cycle, i.e. in the case of a 4-stroke engine to two rotations of the crankshaft. Various designs of the cylinder deactivation are possible for this. A dynamic cylinder shut-off, for example comprising a dynamic change in the number of deactivated cylinders, is conceivable. For example, an alternating shut-off of n, n+1 cylinders is conceivable. It is also expedient to always shut off different cylinders, for the purpose of preventing focusing of wear on particular cylinders or particular cylinder-specific engine components. Furthermore, avoiding a longer deactivation of an individual cylinder brings about cooking thereof, and an increased requirement for cooling power with respect to the entire engine.

The above explanation related to the ideal situation of the rail pressure target pressure remaining constant, irrespective of the current engine load. It is also possible, however, to vary said target value rail pressure at least in a comparatively small range which, however, is significantly narrower than the required spread in the case of a conventional internal combustion engine in which the current rail pressure target value already varies very significantly in the event of a comparatively small change in the engine load and/or a comparatively small change in the engine speed. With respect to the rated value of the rail (see below), for an internal combustion engine according to the disclosure the rail pressure target value range changes by at most 20 percent, optionally by at most 10 percent, and further optionally only by at most 5 percent. The wording rated value of the rail means the maximum value of the rail pressure provided for the actual use, i.e. the rail pressure which must be present according to the engine controller, at the engine operating point or in the operating situation of the maximum fuel requirement of the internal combustion engine still to be covered.

Various designs are conceivable for the fuel injection from the rail into the combustion chambers. Port injection is conceivable, wherein in this case the constant or at least approximately constant rail pressure target value should be in an order of magnitude between 8 bar and 25 bar, optionally between 10 bar and 20 bar, and optionally between 12 bar and 18 bar.

On account of the rail pressure target value which remains constant or at least approximately constant during operation, a flexibility in the design of the rail results. In particular for a gas engine which is operated by means of the method according to the disclosure, the total volume available, which holds the fuel, provided for the injection, directly available, referred to in the following as the effective rail volume (see below), can be significantly increased, from which an internal combustion engine according to the disclosure clearly derives the advantage that, as a result, the greatest possible constancy, desired in the is case, is promoted. The ratio of the effective rail volume and the engine total displacement can optionally be at least 4% and at most 40%, optionally at least 4% and at most 25%, and optionally at least 8% and at most 25%. With respect to these percentages, the underlying number values contain not only the respective rail volumes, but rather additionally in each case also the cumulative inner volume in the fuel high-pressure connections between the rail and the respective injectors. For this reason, the wording effective rail volume is used.

Alternatively to the port injection, the supply of fuel into the combustion chambers can also take place by means of direct injection. A low-pressure and a high-pressure direct injection are conceivable at this point. In the case of a low-pressure direct injection, there is optionally a constant target level of the rail pressure, wherein said target value is between 8 bar and 25 bar, optionally between 10 bar and 20 bar, and optionally between 12 bar and 18 bar. In the embodiment of a high-pressure direct injection, there is optionally a constant target level of the rail pressure, wherein said target value is in an order of magnitude between 150 bar and 500 bar, optionally between 200 bar and 400 bar, and optionally between 200 bar and 350 bar.

In the embodiment of a direct injection, the ratio of the available effective rail volume and the engine total displacement can be at least 1% and at most 32%, optionally at least 2% and at most 16%, and optionally at least 2% and at most 8%.

As has already been explained above, a cylinder deactivation can be performed in order to adjust the engine operation depending on the engine load. In this case, it can be provided for the gas exchange valves of a deactivated cylinder to be operated differently from the valves of an activated cylinder. In this case, it can optionally be provided for the gas exchange valves of a deactivated cylinder to remain completely closed. In general, the active cylinder deactivation can be a dynamic cylinder shut-off i.e. the number of cylinders to be deactivated changes dynamically depending on the current engine load.

For charging the rail, a high-pressure pump, referred to as a rail pressure pump, is provided, which compresses the fuel, withdrawn if necessary from the primary tank, and supplies it to the rail, in such a way as to prevent or at least counteract the rail pressure actual value falling below the rail pressure target value. Since, according to the method according to the disclosure, the same or at least approximately the same level of the rail pressure is maintained even in the low speed range or even in idle operation of the internal combustion engine, i.e. in the case of a comparatively low fuel requirement, as in high-load operation, the rail pressure pump has to be designed accordingly. A conventionally operated rail pressure pump, which is also moved at a fixed speed transmission ratio with respect to the crankshaft speed, would clearly be very unfavorable in terms of energy and with respect to the wear to be anticipated. A rail pressure pump which can be operated according to need is optionally used, the delivery rate and output pressure of which can be operated independently of the crankshaft speed. In this respect, for example a clocked actuation of the rail pressure pump is conceivable, wherein the clock rate is synchronized to those time periods within which a respective injection of fuel into the active cylinders of the internal combustion engine is due. A possible implementation is that of driving the rail pressure pump by means of an electric motor. In an advantageous implementation, the rail pressure pump can be operated in a predictive manner by means of corresponding software, which is optionally a component of the engine controller. Optionally, the entire fuel provision path, from the primary tank as far as the rail, is operated in a predictive manner. There is then the option that, in the case of an increase in the fuel requirement, instead of a decline of the rail pressure actual value occurring, which value is raised to its target value again merely in a lagged manner, instead an anticipatory slight increase in the rail pressure can be implemented, as a result of which, instead of a comparatively large decline in the rail pressure actual value, a stabilization around the rail pressure stored in the engine controller as the best value, can take place. The latter measure allows for stabilization of the rail pressure actual value, which moves merely within a small range around said best value.

In addition to the method according to the disclosure, the present disclosure also relates to an internal combustion engine comprising at least two cylinders and a system for fuel injection, in which the fuel can be withdrawn from a primary tank and can be supplied to a rail in a form significantly compressed compared with atmospheric pressure, wherein a plurality of and optionally all the cylinders draw fuel from the rail used collectively. According to the disclosure, the internal combustion engine comprises an engine controller which is designed to carry out the method according to the present disclosure. Accordingly, the same advantages and properties result for the internal combustion engine as have already been set out above, with reference to the method according to the disclosure. Therefore, a repeated description is omitted.

BRIEF DESCRIPTION OF THE FIGURES

Further advantages and properties of the disclosure will be set out in the following, with reference to the figures, in which.

DETAILED DESCRIPTION

The disclosure relates to a method for operating an internal combustion engine which draws a gaseous fuel and comprises a system for fuel injection. In this respect, an internal combustion engine according to the disclosure of this kind can be based on the fundamental structure of a common rail system according to FIG. 1, which comprises a rail 2. The supply of fuel into the combustion chambers (not shown) takes place over opening time periods of the respective injectors 1, which draw the gaseous fuel, in particular hydrogen, from a rail 2. This is supplied with fuel, withdrawn from the primary tank (not shown), by means of a rail pressure pump 6. In the embodiment shown, the volume flow from the primary tank to the rail pressure pump 6 is controlled by the motor controller 3 by means of the volume flow control valve (VCV) 5.

A pressure sensor 7 detects the rail pressure, i.e. the pressure inside the rail 2, the value of which is taken into account in the motor control 3. The gaseous fuel can be discharged from the rail 2 via a pressure control valve (PCV) 4 that can be controlled by the motor controller 3. In a simple embodiment, presupposing that a sufficiently large fuel inflow can be covered, the rail pressure can be controlled to or otherwise held at a defined target value simply by actuation, determined by the engine controller 3, of the valves 4, 5. Holding in another manner can be achieved for example by a controller. In an embodiment, the internal combustion engine comprises a rail pressure pump which can be operated according to need. In addition to the starting value of the pressure sensor 7, the engine controller 3 obtains numerous further operating variables and parameters of the drive system 10, as well as quantitative information relating to operating interventions, of which in FIG. 1, merely by way of example, the measured value signal flow of a crankshaft sensor 11 and the measured value signal flow of a camshaft sensor 12 are shown. In addition to the valves 4, 5, the engine controller 3 can also specify the opening and closing of a relevant injector 1. Therefore, inter alia a temporary deactivation of individual cylinders of the engine controller 3 is expedient.

What is characteristic for the disclosure at this point is in particular the novel engine controller 3 for controlling the target pressure value within the rail 2, in particular in conjunction with a load-dependent dynamic cylinder shut-off.

The method according to the disclosure and/or the internal combustion engine according to the disclosure is characterized in that the rail pressure target value exhibits a very significantly reduced dependency on the speed/torque operating point of the internal combustion engine, and is optionally even constant. Clearly, in the case of the internal combustion engine according to the disclosure, the same power range must be covered, starting at an idle operation, up to the operating points along the full-load characteristic curve. Furthermore, the possible use of the internal combustion engine according to the disclosure should be able to be fulfilled in particular for applications which have high dynamics requirements.

The reproducibility of a fuel injection amount is significantly worse in the case of shorter opening time periods of an injector 2, while maintaining all other conditions influencing this, than in the case of fuel injections during a longer opening time period, which can be explained with reference to the graph shown in FIG. 2. The simplified time curves of the injector current 14, the injection rate 15 and the rail pressure 13 during an injection process are shown. Before the injection process considered, the rail pressure 13 was raised to a particular level. The energization of the injector 1 results in its opening, and thus initiates a fuel inflow from the rail 2 in the direction of the combustion chamber, whereupon the rail pressure 13 reduces. In reality, too, there is a certain time delay between the electrical current flow 11 to the injector 1 and the through-flow of fuel 12, which is shown on the graph in an excessive order of magnitude for clarity.

The actuation of an injector 1 of this kind, which is also suitable for delivering high injection rates, usually takes place via a solenoid valve, i.e. ultimately via an electromagnet. Thus, the electrical circuit, which is arranged inside the injector 1, exhibits a comparatively high inductance. It is known that the presence of an inductance in an electrical connection leads to a delayed current strength change along said connection. Since quick response times are essential for the opening and closing of an injector 1, the electrical circuit for energizing the electromagnets is correspondingly expanded, with the aim of compensating the delay caused by the inductance of the solenoid, which is possible to a certain extent. However, focusing on this measure is irrelevant in the consideration to be taken here. In addition to the delay for electrical reasons, a delay for mechanical reasons is added, caused by the movement of the valve needle into its opening position. An artefact of the electrical compensation measures for reducing the switch-on time duration of the electromagnet is the brief sharp excessive increase in the injector current 14.

Figure 2:
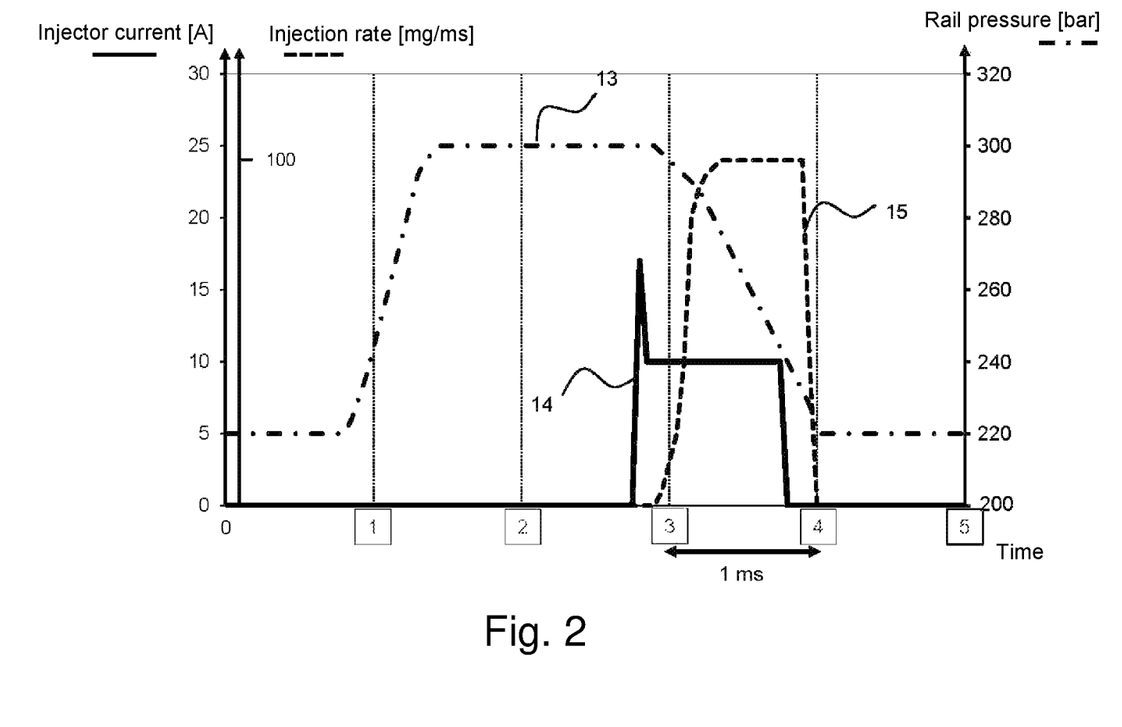
FIG. 2: is a time graph illustrating the relevant state variables in the case of fuel injection.

While the injector 1 opens, a fuel inflow already begins, and while the injector already closes there is initially still a fuel inflow, the time duration of which is shown exaggerated in FIG. 2 for reasons of clarification. During these switching transitions, the pressure drop along the injector fuel path is far less well defined than in the case of a fully open injector 1, since in the case of a fully open injector 1 a constant or at least approximately constant flow resistance exist in the fuel path considered. On account of what is known as the injector bouncing, not even the movement processes of the closure element of an injector 1 are exactly reproducible. In the case of a comparatively large store of fuel in the rail 2 and a low injection rate, the latter remains approximately constant, provided that the rail pressure changes only on account of the injection process considered, i.e. reduces slowly.

Accordingly, in order to achieve a high injection amount accuracy longer injector opening times are advantageous, because the fuel amounts which are rather undefined during the switching transitions make up a smaller portion of the total amount of fuel that has been injected during a complete injection process (from the start to the end of an injection).

In order that the extremely short opening times of the injectors 1, which result in a common rail system according to the prior art if the internal combustion engine is in the lower partial load operation and, most markedly, in idle operation, are avoided, the disclosure provides for a deliberate cylinder deactivation in the event of a low capacity utilization of the internal combustion engine. The latter avoids, in the case of an internal combustion engine according to the disclosure, a significant reduction in the number of main injections in which there are comparatively short opening times of the injectors 2. Furthermore, with respect to the main injections, the entire collective time of the injector opening times which occur at a low to medium capacity utilization of the internal combustion engine is very significantly increased. Short or even extremely short injector opening times are therefore very disadvantageous, because in this case the majority of the entire fuel supply amount occurs during said switching transitions, and therefore there is a comparatively large deviation between the respectively corresponding actual values and target values of a fuel portion of an injection process. According to the disclosure, the variability of the rail pressure target value is limited to a very low quantity, and optionally entirely prevented, depending on the capacity utilization of the internal combustion engine. Similar applies for the rail pressure actual value. Clearly, the rail pressure actual value must be permanently in an order of magnitude by which, optionally, a fuel supply for the operating situation of the maximum fuel requirement can currently be covered, or at least be very close to such a pressure level, such that a corresponding increase in the rail pressure, and thus a corresponding fuel supply, is possible within a very short time. Holding the rail pressure largely constant has the additional benefit that the spray hole geometry of an injector nozzle can be formed such that it can be designed as optimally as possible for a very particular pressure level of the fuel to be injected. With regard to a dynamically operated internal combustion engine, as a result of implementing a measure of this kind, i.e. for an internal combustion engine according to the disclosure, the fuel spray patterns of the injections have a technically far more advantageous appearance, which is in turn far more favorable for the entire combustion process.

With respect to the structural design thereof, the system according to the disclosure can additionally differ with respect to conventional systems in that the capacity provided, in the rail 2, for temporary fuel storage, is dimensioned so as to be substantially larger than in the case of internal combustion engines not according to the disclosure. More precisely, in an internal combustion engine according to the disclosure the capacity K provided for the temporary storage of fuel is significantly larger with respect to the chemical energy content of the fuel in the rail 2, with respect to the corresponding total displacement volume V. For improved readability of the following text, the term or the magnitude of the characteristic numerical relationship $c=K/V$ is introduced. The characteristic relationship c is influenced essentially by the volumetric energy density of the fuel, taking into account the rail pressure.

According to the prior art of corresponding and otherwise comparable internal combustion engines, the characteristic numerical relationship c is dependent to a significant extent on the current engine delivery power. In the case of an internal combustion engine according to the disclosure, the characteristic numerical relationship $c=K/V$ is optionally constant in all speed/torque operating points and, when viewed in reality, exhibits a low to very low dependency on the current engine delivery power. For the following text, the designation effective rail volume is used. This is the entire inner volume in which the fuel compressed under a high pressure level, referred to as the rail pressure, is located. This includes the inner volume of the rail 2 plus the total volume of all the connection lines between the actual rail 2 and the respective interior portions of the injectors 1, which are still filled with the fuel under rail pressure, even in the case of a closed injector 1.

In the applications of a cylinder deactivation known from the prior art, a higher efficiency of the internal combustion engine should be achieved in lower and medium partial load operation, and/or an increase in the exhaust gas temperature should be achieved while preventing an increased fuel consumption, which temperature increase is required or at least advantageous for the subsequent treatment of the exhaust gas. Although use can also be made of these advantages in the case of the internal combustion engine according to the disclosure, primarily, however, the aim of a virtually constant target pressure in the rail 2 is pursued by the selective cylinder deactivation, in the case of the internal combustion engine according to the disclosure. The internal combustion engine according to the disclosure, operated using a gaseous fuel, offers significantly greater dynamics compared with conventional gas engines, which is a significant advantage for numerous applications, and is fundamentally decisive, for some applications, for a gas engine being suitable for the relevant application at all.

The system or method according to the disclosure can be applied in the case of a cylinder direct injection, but also in the case of a port injection of the fuel. In each case typical maximum rail pressures, in particular for a hydrogen engine, are approximately 20 bar, in the case of a port injection and similarly for a low-pressure direct injection. A typical maximum rail pressure for a high-pressure hydrogen direct injection is approximately 300 bar. It is known to a person skilled in the art that a high-pressure direct injection is the better concept from a purely technical perspective. However, the low pressure is very likely valid on account of its significantly lower complexity. The pressure range of the above-mentioned injection concepts can be summarized as follows:

Direct injection (low-pressure concept)→LPDI:
variable rail pressure, depending on the engine load, of between 8 bar and 20 (25) bar
Direct injection (high-pressure concept)→HPDI:
variable rail pressure, depending on the engine load, of between 150 bar and 300 (400) bar
Port injection:
variable rail pressure, depending on the engine load, of between 8 bar and 20 (25) bar For each of these three concepts, a specific, possible embodiment according to the disclosure of a hydrogen motor is cited in the following. The following table contains the dimensions of the rail 2 used in each case, and the effective rail volume, in each case, of these three embodiments. In that, in a manner deviating from those currently available, such rails are used of which the dimensioning and shaping corresponds to a technical improvement up to a technical optimization with respect to the concept according to the disclosure, the respective effective rail volumes can be increased again.

Figure 3:
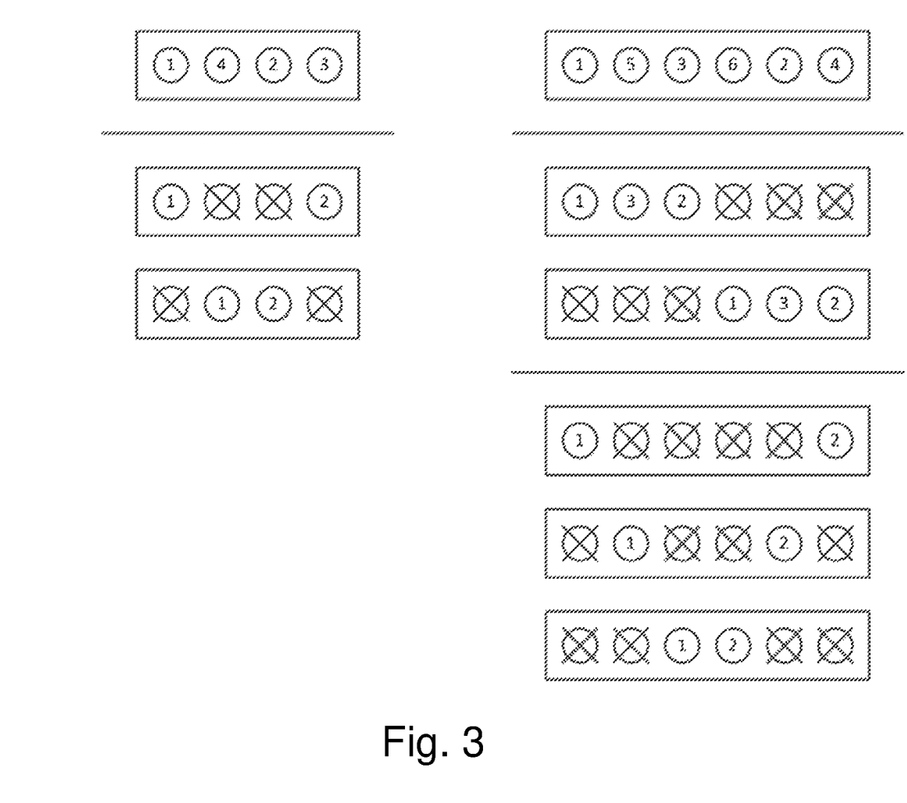
FIG. 3: shows different sequential views for a possible cylinder deactivation of an internal combustion engine.

The displacement of the internal combustion engine specifically studied in this case is approximately 8l in each case. The maximum hydrogen supply amount for a main injection (in one cylinder) in each case reaches a total of approximately 80 mg. At 30° C. and a pressure of 300 bar, the specific weight of hydrogen is approximately 20 kg/m$^3$. At 30° C. and a pressure of 50 bar, the specific weight of hydrogen is approximately 3.5 kg/m$^3$. The following table shows some key data which are essential for tests of the present disclosure already carried out.

constant delivery power in each case, always the same number of cylinders is actively operated, irrespective of the particular value of the delivery power, in two successive operating cycles of the full engine in each case, i.e. in the case of a 4-stroke engine after passing through a crankshaft angle of 720° in each case. In this case, however, it is ensured that it is not always the same cylinders which are deactivated during successive operating cycles, but rather the deactivation is divided over all available cylinders. Possible deactivation patterns are shown by way of example in FIG. 3, for a four-cylinder (left-hand side) and a six-cylinder engine (right-hand side). In the case of the four-cylinder engine shown, either the cylinders 2, 4, or alternatively 1, 3, are deactivated alternately. In the case of the six-cylinder engine, the cylinders 1, 3, 5 or 2, 4, 6 are deactivated together, in alternation. Alternatively, more than the two patterns for deactivation of the cylinders can also be performed; see FIG. 3 bottom right.

In the case of the internal combustion engine designed by way of example as a 4-cylinder combustion engine, it may be the case that the target output power required over a particular time period in fact cannot be provided by two-cylinder operation (2 of the 4 combustion chambers are operated actively, and the remaining two combustion chambers are deactivated, while the power that can be provided in three-cylinder operation is significantly above the target delivery power. In such a design, instead of a permanent three-cylinder operation, alternating operation is proposed. In this case, for example in a first operating cycle of the 4-cylinder combustion engine three cylinders are operated actively, while a fuel supply is stopped in the remaining cylinder, and the gas exchange valves thereof remain closed throughout. In the following operating cycle, in contrast,

TABLE 1

Information relating to the rails used at present for the respective test engines of the three concepts

| Information relating to the rail of the relevant H2 test engine | Information relating to the lines between the rail and the injectors | | Total volume [l] | Rail volume [l] | effective Rail volume [l] | H2 amount in the rail [mg] | Quotient [%] of the maximum amount of an H2 injection with respect to the total H2 content of the rail |
|---|---|---|---|---|---|---|---|
| | Flow diameter [mm] | Lengths [mm] | | | | | |
| HPDI (250 bar) | 3.5 | 4 × 420 | 0.01616 | 0.03982 | 0.05598 | 997 | 5.6 |
| LPDI (50 bar) | 7 | 4 × 420 | 0.06464 | 0.03982 | 0.1045 | 365.75 | 21.9 |
| Port (15 bar) | 7 | 4 × 420 | 0.06464 | 0.03982 | 0.1045 | 110 | 6.6 |

The above table shows the values of a 4-cylinder hydrogen engine. The characteristic numerical value specified for this, in percent, which quantifies the ratio of the amount of hydrogen located in the rail, under operating pressure, and the maximum amount of a main injection, based in each case on the mass of hydrogen. Taking into account the energy density and the engine efficiency, the value for other fuels or different fuel mixtures can be easily calculated.

The numerical values for internal combustion engine having a different number of cylinders may deviate. In the case of a similar number of cylinders, a proportional scaling according to the number of cylinders may be reasonably correct.

The internal combustion engine according to the disclosure can be operated in such a way that, in the event of a only two cylinders are operated actively, while no fuel supply takes place in the remaining two cylinders, and the gas exchange valves thereof remain closed throughout.

Figure 4:
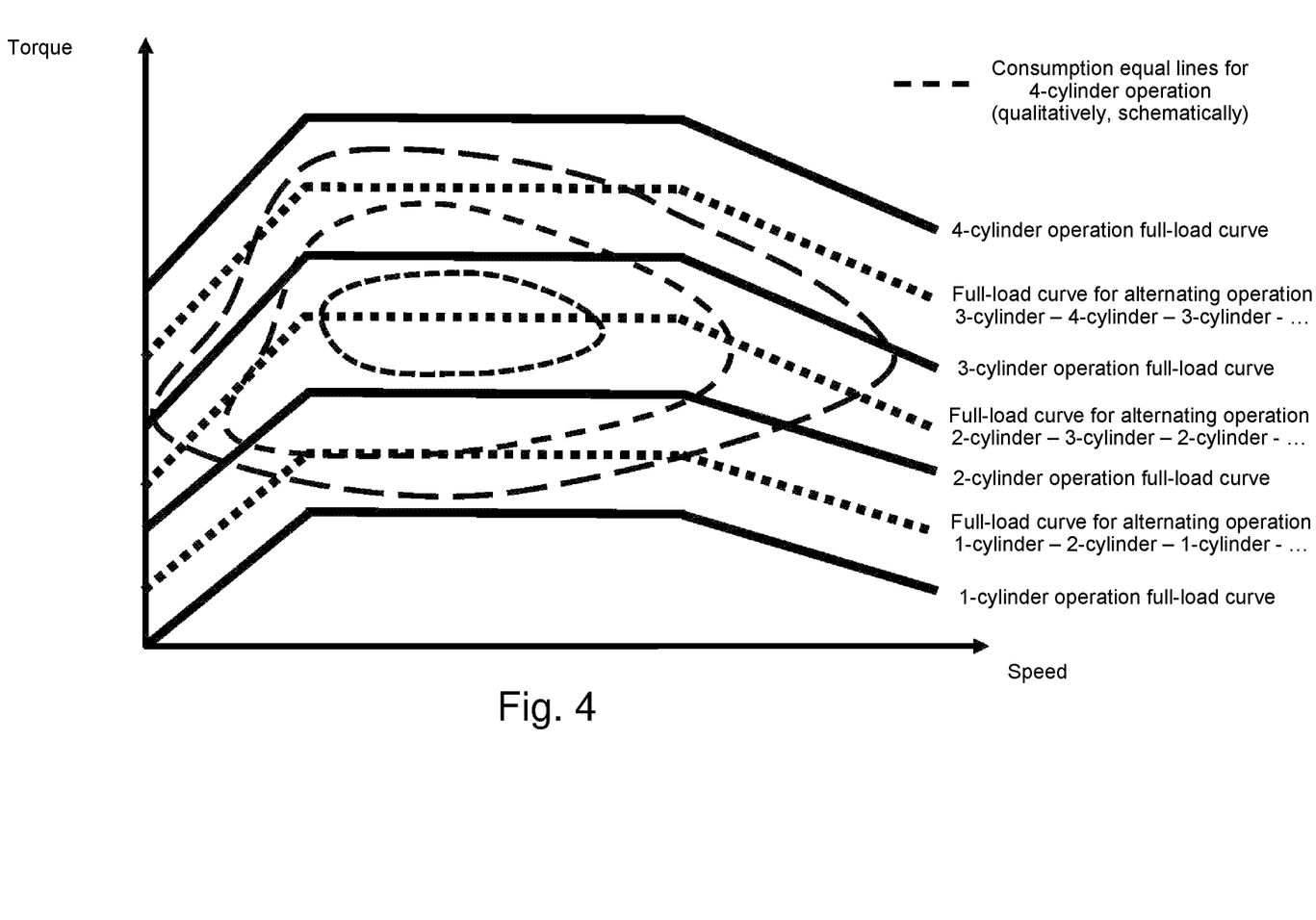
FIG. 4: shows schematically illustrated speed-torque full load curves depending on the active cylinder number (the solid lines in each case), and the corresponding full load curves in alternating operation (the dotted lines) and a schematically indicated fuel consumption characteristic diagram of the 4-cylinder engine.

If the capacity utilization rate for a three-cylinder operation is correspondingly low, and the flutters are tolerable for this, when a corresponding target output power is present in a first and following second operating cycle of the full engine, in each case just two cylinders are operated actively, while in the following third operating cycle of the full engine three cylinders are operated actively. Clearly, the mode of operation illustrated in this case can be transferred to other capacity utilization rates of a 4-cylinder combustion engine, and likewise clearly to those internal combustion engines which comprise a different number of cylinders. In order to illustrate this aspect, FIG. 4 shows, on the basis of a 4-cylinder engine, schematically indicated full load characteristic curves (the maximum torque plotted against the speed) depending on the number of active cylinders (the solid lines), and the full load characteristic curves in the case of alternating operation (the dotted lines) of the 4-cylinder engine.

Ignoring the geometric deviations, which are necessary in order that the connection lines and a rail pressure sensor 7 can be fastened, the known rails 2 have the geometric shape of a prism, and in this case usually the shape of a circular cylinder. The same also applies for the actual storage volume and the external volume of a rail 2. An embodiment of this kind has the advantages that (i) the manufacture is comparatively simple on account of this shaping, (ii) the integration of the rail 2 on the internal combustion engine is comparatively simple and only a comparatively small installation space is required for a rail 2 of this kind, which space is not available for other attachment components, (iii) a high strength is promoted with respect to the lateral surface thereof, and furthermore that (iv) such a shaping of the rail 2 simplifies the respective connection lines between the respective injectors.

The system may use a rail pressure pump 6 that can be operated as needed. Optionally, a rail pressure pump 6 according to the disclosure is used, which can be operated in a clocked manner During operation under deactivation of one or more cylinders, optionally the clock rate of the rail pressure pump 6 for fuel supply into the rail 2 is synchronized to the time periods within which the fuel injection of the active combustion chambers is due, wherein this synchronization does not have to take place simultaneously with the fuel injection.

The operation according to the disclosure of an internal combustion engine according to the disclosure requires the capability for provision of the (approximately) identical rail pressure to already be possible in the low speed range or already in idle operation, as in the operating point of the maximum supply of fuel. Accordingly, driving the rail pressure pump 2 using a fixed speed ratio with respect to the crankshaft would be very disadvantageous.

As explained above, a gas engine according to the disclosure offers a significant potential for improvement of dynamics, as a result of which, when the rail 2 is designed having correspondingly large dimensions—i.e. the rail 2 has a significantly larger inner volume, ultimately even similarly to an internal combustion engine which is operated by a liquid fuel—the air supply can be decisive for the limiting of the dynamics. Such a limitation to a higher level can in turn be reduced in that the air supply comprises a suitable boost system.

The advantages of the combustion engine according to the disclosure can be briefly summarized again below:

A rail 2 having a very much larger inner volume can be used.

This is in turn very advantageous for a fuel of low density and/or high compressibility.

As a result, the control path already obtains a high I portion which promotes the control accuracy.

An embodiment according to the disclosure of the internal combustion engine as a gas engine exhibits significantly increased engine dynamics compared with a gas engine not according to the disclosure, because in the case of a load increase the rail pressure does not first have to be raised to an increased target value. In the case of a fuel which is supplied to the rail 2 in a gaseous aggregate state, such an increase requires a comparatively long period of time, and specifically also if no delivery of fuel from the rail 2 takes place at all in the meantime.

An internal combustion engine according to the disclosure simplifies the rail pressure control, because the rail pressure target value can be held at a constant value, irrespective of the speed/torque engine operating point, or at a target value which, although variable, changes only comparatively slowly and within a very small range, because this at least optionally also does not have any direct dependency on the current operating point of the internal combustion engine, even in the case of a dynamic load cycle.

Since in the case of operation according to the disclosure of an internal combustion engine, collectively those time periods between the respective sequences of a fuel supply interval, consisting in each case of a main injection and optionally pre- and post-injections, are significantly longer, the fuel portion supplied to the combustion chambers under flow conditions that can be reproduced significantly better is increased. Accordingly, with respect to the main injections collectively, the fuel portions actually supplied are better determined. This in turn allows for an improved quantity determination of the reducing agent supplies in each case.

The clear range reduction of the rail pressure allows for a design of an injector 2 that is optimized to an accordingly very particular pressure level, in particular the spray hole geometry thereof, which allows for a high degree of reproducibility of a respective fuel injection amount, and the spray image of the fuel entering the combustion chamber, which in turn favors such a design of the injector 2 which can be optimized, on account of a significantly more strongly determined spray image, in such a way that precisely the spray image within said small range is particularly advantageous for the combustion process.

Simplified raising of parameters for such injectors 2 which are intended to be operated in an internal combustion engine according to the disclosure.

With respect to the main injections, the minimum injection times occurring are significantly longer. Accordingly, there is a comparatively longer time period available for corrections of the injection amount with respect to the available calculating time for such correction calculations and the actuatory implementation of these corrections. Furthermore, more time quotas are available during a current main injection, in which quotas other "tasks" can be performed, e.g. safety functions.

Large amounts of fuel, which would have to be discharged from the rail 2 into a buffer tank, which may be provided, or into the primary tank—the latter presupposing that the fuel provided and the on-board equipment allow this—or would have to be correspondingly discharged in another way, are omitted.

Collectively, there is an increase in the efficiency, since compared with an internal combustion engine which is also operated using all cylinders in low and medium partial load operation, the active cylinders of an internal combustion engine according to the disclosure are collectively operated under a significantly increased medium pressure.

An increase in the exhaust gas temperature in low and medium partial load operation of the internal combustion engine results, which in turn increases the effectiveness of the exhaust gas post-treatment and/or offers a starting point for a potential increase in said effectiveness, with respect to the selective catalytic reaction.

LIST OF REFERENCE CHARACTERS

Fuel injector 1
Rail 2
Engine controller 3
Pressure control valve PCV 4
Volume flow control valve VCV 5
Rail pressure pump 6
Pressure sensor 7
Drive system 10
Measured value crankshaft sensor 11
Measured value camshaft sensor 12
Rail pressure time curve 13
Injector current time curve 14
Time curve of the fuel injection rate 15

The invention claimed is:

1. Method for operating an internal combustion engine comprising at least two cylinders and a system for fuel injection, in which gaseous fuel can be withdrawn from a primary tank and can be supplied to at least one rail in a compressed form compared with atmospheric pressure, and a plurality of cylinders can draw gaseous fuel from a rail used collectively,
wherein
during operation of the internal combustion engine, a rail pressure target value of the gaseous fuel stored in the rail is held at a constant value or a variable target value, irrespective of an engine operating point, the variable target value changing only in a small range B, and
wherein at least one cylinder is actively shut off during operation of the internal combustion engine under partial load, and wherein a dynamic cylinder shut-off having a varying number of cylinders deactivated simultaneously is performed, wherein the number of cylinders to be deactivated is preferentially determined depending on a current engine load and the number of deactivated cylinders is changed in an alternating manner in successive operation cycles of the internal combustion engine.

2. Method according to claim 1, wherein a supply of fuel into the plurality of cylinders takes place via port injection, and a constant or lastingly approximately constant rail pressure target value is in a range between 8 bar and 25 bar and an effective rail volume, with respect to a total displacement of the internal combustion engine, is in a range between 4% and 40%.

3. Method according to claim 2, wherein the supply of fuel into the combustion chambers takes place via direct injection.

4. Method according to claim 3, wherein a low-pressure direct injection takes place, and the constant or lastingly approximately constant rail pressure target value is in a range between 10 bar and 20 bar.

5. Method according to claim 3, wherein a high-pressure direct injection takes place, and the constant or lastingly approximately constant rail pressure target value is in a range between 150 bar and 500 bar.

6. Method according to claim 3, wherein the effective rail volume, with respect to the total displacement of the internal combustion engine, is in a range between 1% and 32%.

7. Method according to claim 1, wherein a dynamic cylinder shut-off having a constant or varying number of cylinders deactivated simultaneously is performed, wherein the number of cylinders to be deactivated is preferably determined depending on a current engine load.

8. Method according to claim 7, wherein opening times of injectors, existing for respective main injections, are not changed depending on the engine load.

9. Method according to claim 1, wherein the rail pressure target value is set with respect to a rated value of the rail of the internal combustion engine.

10. Method according to claim 1, wherein the gas exchange valves of a deactivated cylinder can be operated differently from a case of said cylinder being kept active, and in this case the gas exchange valves of a deactivated cylinder remain completely closed.

11. Method according to claim 1, wherein a rail pressure pump is operated in a clocked manner for charging the rail with fuel, wherein a clock rate of the rail pressure pump is in particular synchronized to such time periods within which an injection of fuel into an active cylinder of the internal combustion engine is due.

12. Method according to claim 1, wherein the gaseous fuel is hydrogen or natural gas, or contains hydrogen or natural gas in molecular form.

13. Gas engine comprising at least two cylinders and a system for fuel injection, in which the fuel can be withdrawn from a primary tank and can be supplied to at least one rail in a compressed form compared with atmospheric pressure, and the gaseous fuel can be supplied to a plurality of cylinders from the rail used collectively, wherein the internal combustion engine comprises an engine controller which is configured to carry out the method according claim 1.

* * * * *